(12) United States Patent
McLaughlin et al.

(10) Patent No.: US 7,062,038 B1
(45) Date of Patent: Jun. 13, 2006

(54) SYSTEM AND METHOD OF USING TWO COEFFICIENT BANKS IN AN ADAPTIVE ECHO CANCELLER

(75) Inventors: Hugh Joseph McLaughlin, Mountain View, CA (US); Jeffrey Lynn Schenck, San Jose, CA (US); Sandeep Ghael, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 10/738,757

(22) Filed: Dec. 16, 2003

Related U.S. Application Data (60) Provisional application No. 60/434,079, filed on Dec. 17, 2002.

(51) Int. Cl.
*H04B 3/23* (2006.01)
(52) U.S. Cl. .............................. 379/406.08; 379/406.11
(58) Field of Classification Search ..............................
379/406.06–406.11
See application file for complete search history.

(56) References Cited

U.S. PATENT DOCUMENTS

| | | | |
|---|---|---|---|
| 5,610,909 A | 3/1997 | Shaw | |
| 5,631,899 A | 5/1997 | Duttweiler | |
| 5,777,913 A * | 7/1998 | Rasmusson | ................. 708/322 |
| 6,009,083 A | 12/1999 | Flanagan et al. | |
| 6,263,078 B1 | 7/2001 | McLaughlin et al. | |

* cited by examiner

*Primary Examiner*—Daniel Swerdlow
(74) *Attorney, Agent, or Firm*—Marger Johnson & McCollom, P.C.

(57) ABSTRACT

A device has a first echo canceller having a first bank of coefficients to be applied to a reference signal to produce a first echo prediction signal, and a first arithmetic unit to combine the first echo prediction signal with the echo-bearing signal to produce a first echo-cancelled signal. A second echo canceller receives the reference signal and the first echo-canceled signal, and has a second bank of coefficients to be applied to the reference signal to produce a second echo prediction signal. The second bank of coefficients is adapted to improve echo cancellation in the second echo canceller. A second arithmetic unit combines the first echo-cancelled signal with the second echo-prediction signal to produce a second echo-cancelled signal. A third echo canceller receives the second echo prediction signal and has an adaptive gain to be applied to the second echo prediction signal to produce a third echo prediction signal, and a third arithmetic unit to combine the third echo prediction signal with the first echo-cancelled signal to produce a third echo-cancelled signal. The device also has a selector to select one of echo-cancelled signals.

27 Claims, 7 Drawing Sheets

SYSTEM AND METHOD OF USING TWO COEFFICIENT BANKS IN AN ADAPTIVE ECHO CANCELLER

This application claims priority from U.S. Provisional Application Ser. No. 60/434,079 filed Dec. 17, 2002.

BACKGROUND

An echo canceller is a device that removes echo by subtracting the predicted value (echo prediction) from an echo-bearing signal that is composed of echo and a desired signal. The echo prediction is subtracted from the echo-bearing signal to remove the echo and this leaves mostly the desired signal. In practice the echo prediction is never perfect. Consequently there is usually some residual echo left over.

All echo cancellers require a reference signal. The reference signal is the known signal that is played out to a destination. For the application of acoustic echo cancellation, the reference signal is played out to a loudspeaker transducer to produce sound. At the same time the reference signal is directed to an adaptive filter to compute the echo prediction signal. The loudspeaker causes sound and much of this sound arrives at the microphone by way of both direct path echo and indirect echo reflections.

Figure 1A:
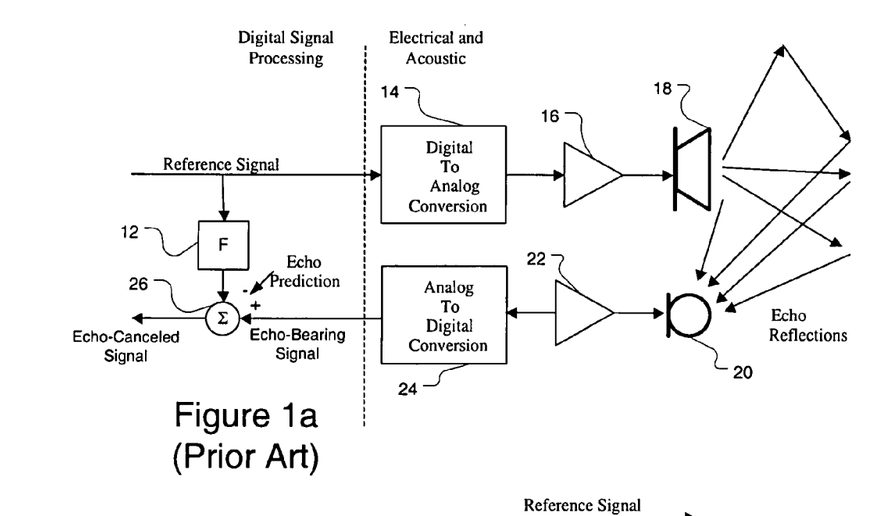
FIGS. 1a and 1b are prior art embodiments of an echo-canceller and its associated topology.

The arrangement of the acoustic echo canceller and the electrical and acoustic elements is illustrated in FIG. 1a. There are two inputs to an echo canceller, a reference signal and an echo-bearing signal. The echo canceller subtracts an estimate of the echo provided by 12 from the echo-bearing signal at 26 to create an echo-cancelled signal. The echo-cancelled signal is used as the means to adapt the coefficients of the echo model to improve the estimate of the echo. The signal that remains after cancellation consists of residual echo and the desired signal for transmission.

Figure 1B:
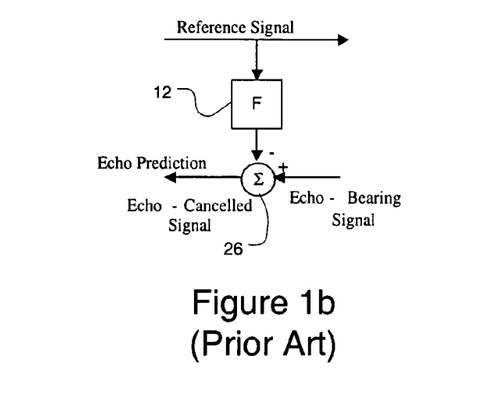

FIG. 1b shows an example of a typical echo canceller topology. Note this figure is identical to the digital signal processing part of FIG. 1a. In the figures that follow, the electrical and acoustic portion of the echo canceller arrangement is not shown. The embodiments of the invention pertain to the digital signal processing portion and the topology of that signal processing.

A problem with echo cancellation, especially for acoustic echo cancellation, is that the actual acoustic echo response can change suddenly. This change can result from many situations. For example, a person might move or put a hand in the echo path between the loudspeaker and the microphone. This causes a divergence between the echo canceller's prediction of the echo and the actual echo. The divergence may result in substantial residual echo that might be perceptible to a far-end listener.

In pragmatic acoustic echo cancellation situations, the echo coupling consists of direct and indirect coupling. The direct coupling is the echo that is due to the immediate acoustic echo path not including reflections off of walls and furniture. The direct coupling is equivalent to the echo that would be measured if the phone unit were in an anechoic chamber.

Disturbances to the echo path modify both the direct coupling and indirect coupling. In some instances, the prior art teaches that direct coupling should be fairly stable. There are many situations where the direct coupling response can be severely modified, for example, by obscuring the microphone hole, cupping a hand near a microphone to redirect sound into the microphone, and putting a big, hard, flat surface near the loudspeaker-to-microphone path. In these situations, the direct coupling portion of the echo is severely modified and the stable presumption for direct coupling is no longer true. For these situations, there is a high motivation to have a technique that detects severe echo path changes and makes fast adaptation to prevent echo from being heard.

BRIEF DESCRIPTION OF THE DRAWINGS

The invention may be best understood by reading the disclosure with reference to the drawings, wherein.

DETAILED DESCRIPTION OF THE EMBODIMENTS

FIGS. 2, 3, 4 and 5 show various prior art multi-bank echo canceller schemes. In general, most focus has been on adaptive filters that consist of a single set of coefficients. The number of coefficients may be quite large in the case of acoustic echo, with some echo canceller models consisting of a set of 2000 coefficients, for example. The whole coefficient set forms a single solution to the echo response.

There has also been significant effort to partition the echo canceller coefficients into two or more sets. The subject of this invention is a method of utilizing two or more sets of coefficients to achieve improved performance. Consequently, the prior art analysis consists of multi-set echo canceller schemes.

Figure 2:
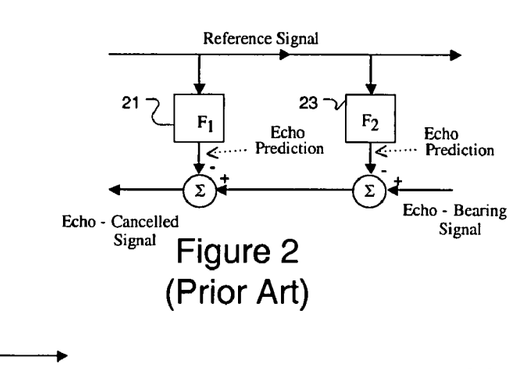
FIGS. 2–5 are prior art embodiments of echo-cancellers.

FIG. 2 shows an approach as set forth in U.S. Pat. No. 5,631,899, referred to here as the Duttweiler reference. Duttweiler teaches a technique where the first echo canceller 23, which is closest to the echo source, is an echo canceller that has a relatively small number of slowly adapting coefficients $F_2$. The second echo canceller 21 consists of more coefficients $F_1$, but adapts faster than the first echo canceller. Duttweiler teaches that this technique responds faster to dramatic changes in the echo response than a single-bank canceller could. Duttweiler also teaches that the first echo canceller corresponds to the direct echo coupling, while the second echo canceller is substantially for the indirect echo coupling. The presumption of this approach is that the direct echo coupling is stable while the indirect echo coupling is highly changeable. Embodiments of the present invention teach that both the direct echo coupling and the indirect echo coupling are highly changeable. The Duttweiler reference demonstrates a similar topology to the present invention in that two coefficient models are connected in parallel.

Figure 3:
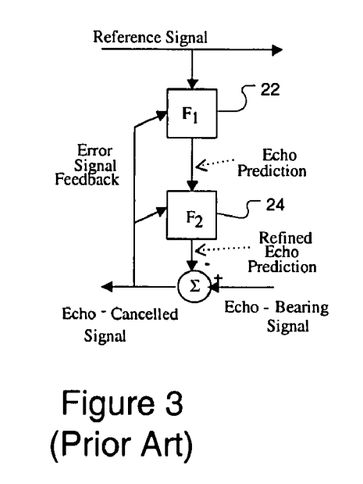

FIG. 3 shows an approach described in U.S. Pat. No. 6,009,083, referred to here as the Flanagan reference. In this approach, two coefficient models 22 and 24 are concatenated, where one set of coefficients $F_1$ is essentially frozen while the other set $F_2$ is allowed to adapt. The topology of this patent is clearly distinct from the embodiments of the present invention.

Figure 4:
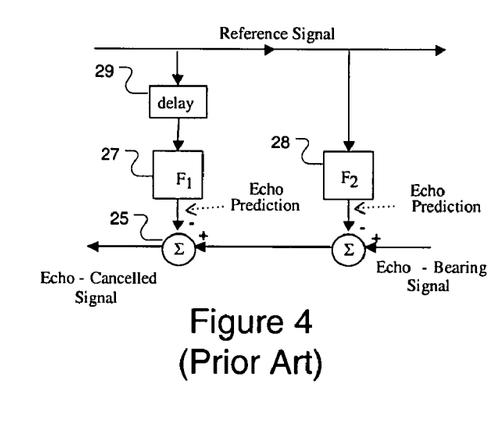

FIG. 4 shows an approached used in U.S. Pat. No. 5,610,909, referred to here as the Shaw reference. In this approach, two echo cancellers 27 and 28 are cascaded in a similar topology to the Duttweiler reference, but one coefficient model is delayed by a bulk delay 29, so that one coefficient set estimates only the short-time echo and the second coefficient set estimates the echo that occurs after the first coefficient set. Shaw teaches that the short-time echo canceller can readapt to echo response changes faster than a single bank adaptive filter.

Figure 5:
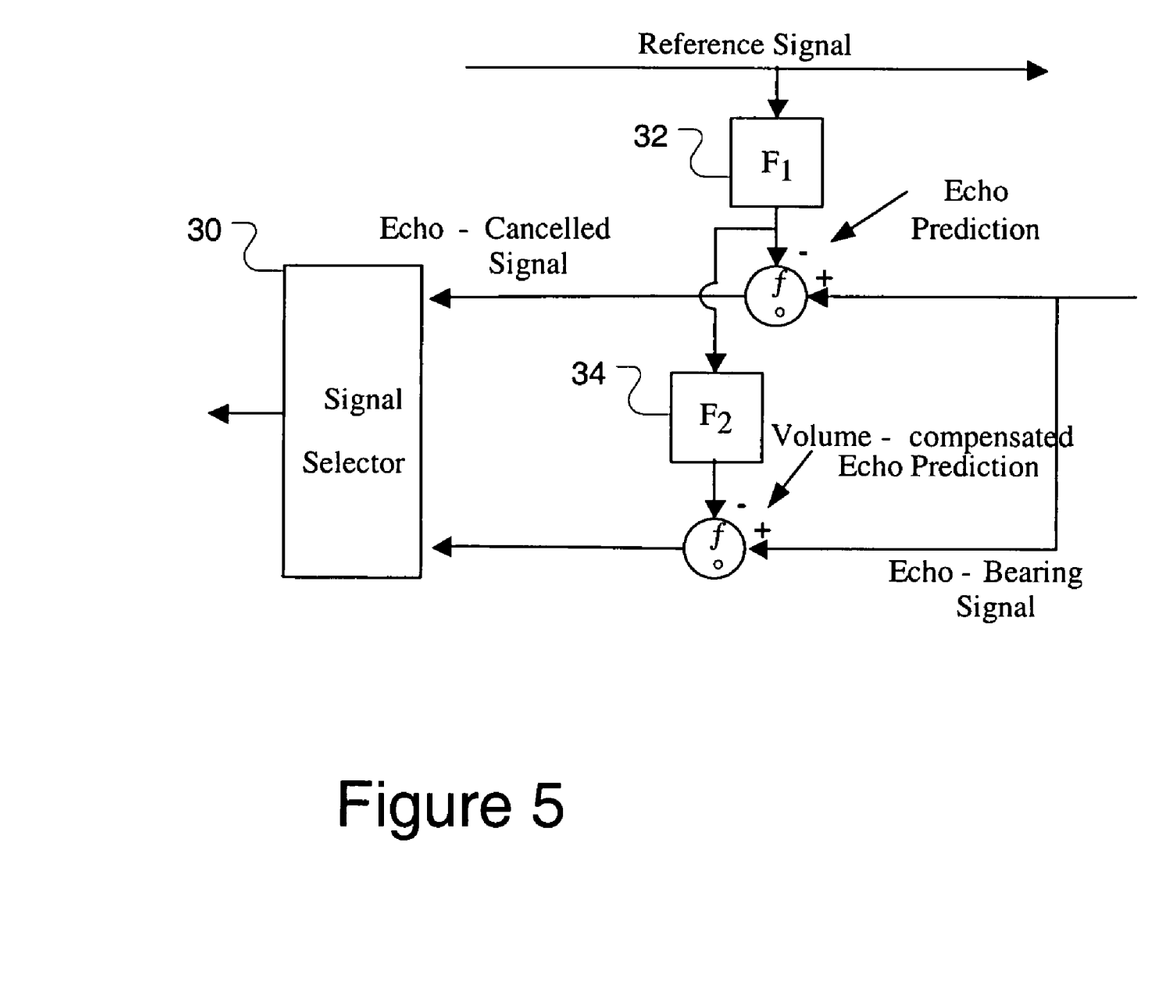

FIG. 5 shows an approach demonstrated in U.S. Pat. No. 6,263,078, the McLaughlin configuration for a fast volume compensator. This consists of one large main set of coefficients in 32 and then a single coefficient to modify the response of the main set of coefficients in 34. This scheme was used as a way to quickly readapt the echo canceller when the echo response changed due to a change in an analog volume control, allowing a selection between a predicted signal and a volume-compensated prediction signal. The embodiments of the present invention use the topology of this scheme as a portion of the whole topology of the present invention.

There are many variations of echo cancellers, but they all possess an adaptive filter in a generic configuration as shown in FIG. 1*a*. There are two computational parts of the adaptive filter: (1) convolution, or computation of the model estimate, and (2) adaptation. In addition, there is a control algorithm that decides when to adapt and sets the step size or rate of adaptation. It is difficult for the control algorithm to determine if a sudden error signal is actually valid near-end speech or is actually residual echo. The control algorithm may be inaccurate for some time. The control algorithm might react as if the echo is actually a valid near-talker signal.

Figure 6:
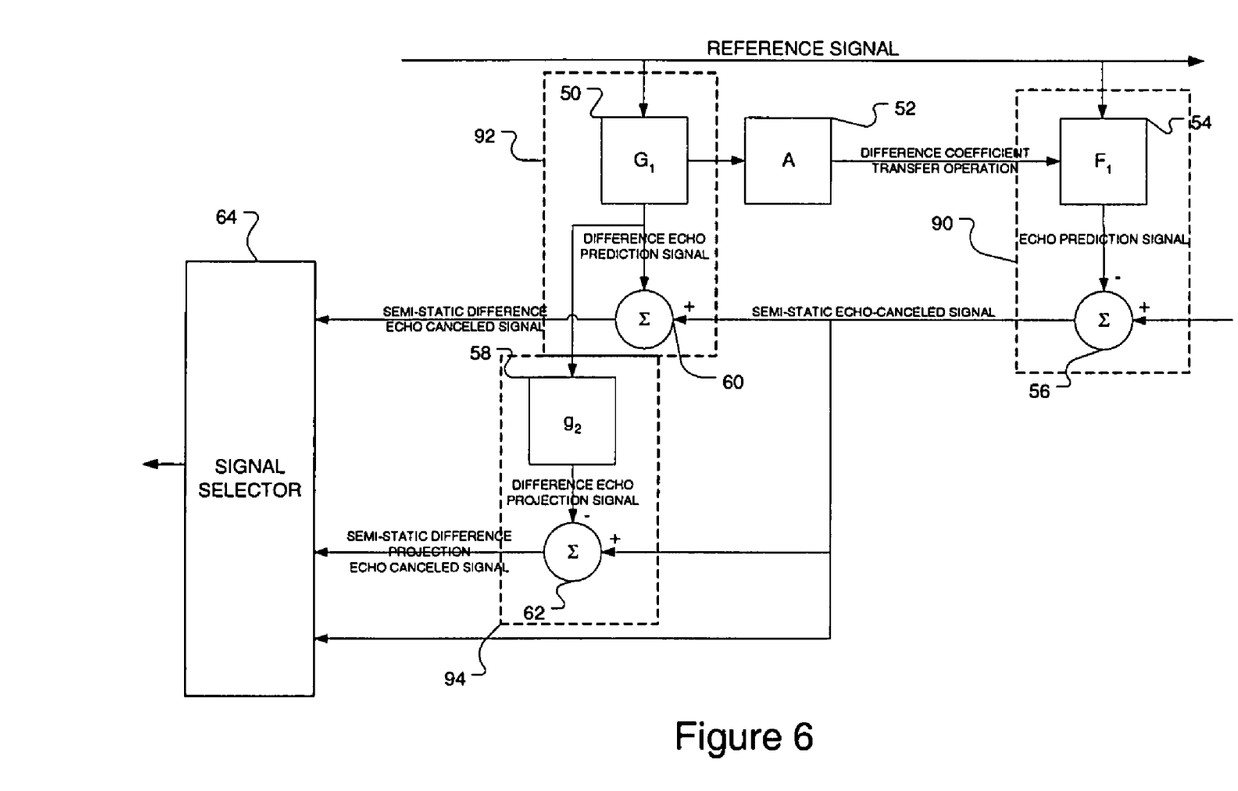
FIG. 6 is one embodiment of an echo-canceller.

One embodiment of the present invention is shown in FIG. 6. In FIG. 6, there is a first echo canceller 90 that is utilized in a typical fashion. The reference signal is the same as the signal that is sent to the loudspeaker. The echo prediction created by application of a first filter 54 having coefficient bank 54 is subtracted from the microphone signal at 56 to provide the echo-removed signal that should consist mostly of just near-end speech and near-end background noise. The coefficients of the first echo canceller are not adapted by normal adaptation means. Rather, these coefficients are derived from the coefficients of the second adaptive echo canceller through the difference coefficient transfer operation at 52.

Figure 7:
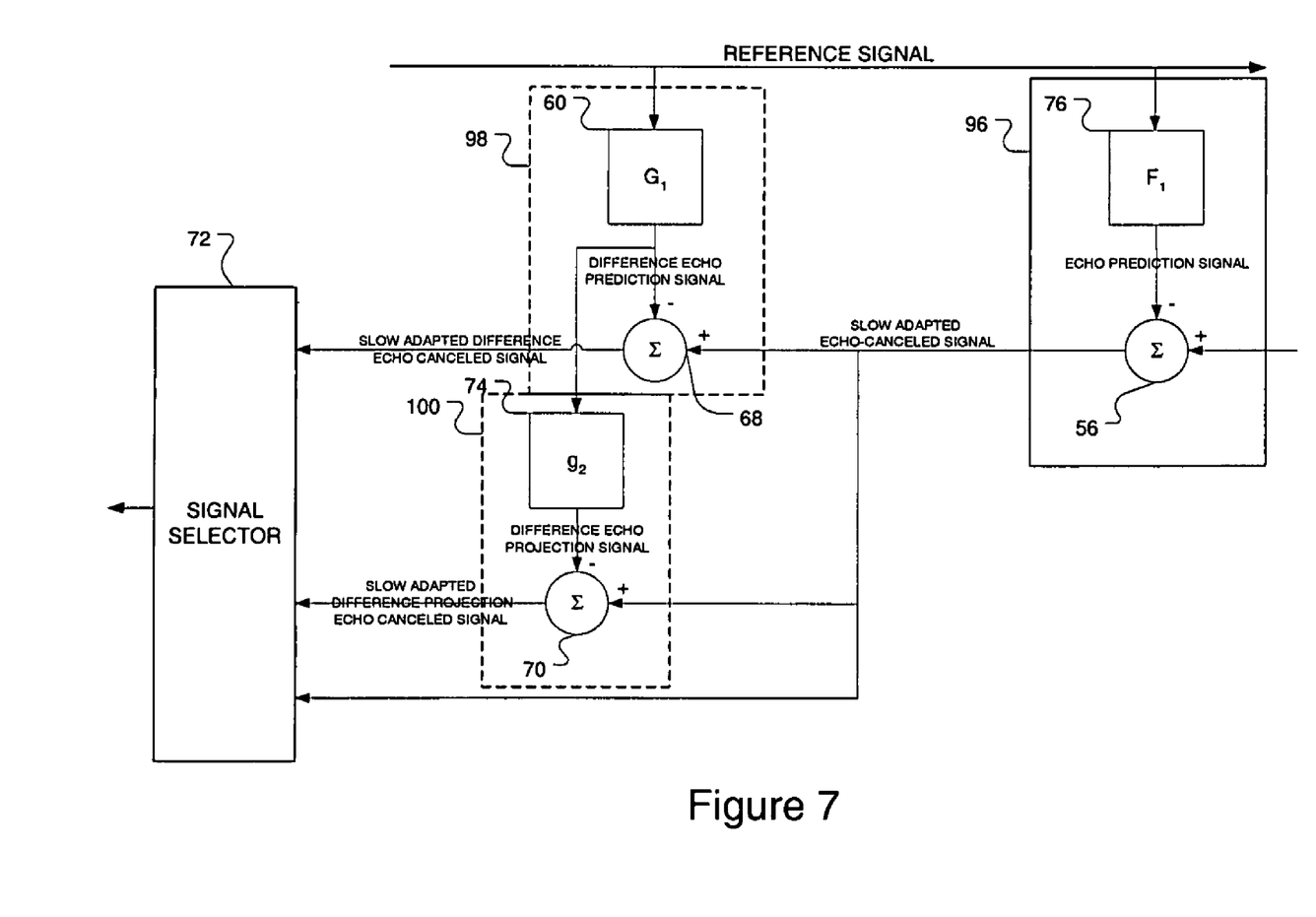
FIG. 7 is an alternative embodiment of an echo-canceller.

It must be noted that the embodiment in FIG. 6, and FIG. 7, are the digital signal processing portions of a device such as that shown in FIG. 1*a*. The device has a loudspeaker and a microphone, digital-to-analog and analog-to-digital converters, as well as amplifiers, etc. It is in the digital signal processing portion of this device that embodiments of the invention would be applied.

Unlike Duttweiler, the number of coefficients of each echo canceller is the same for the first coefficient bank 54 and the second coefficient bank 50. Unlike Shaw, the coefficients of the two echo cancellers span identical segments of time of the impulse response of the echo.

The coefficients of the first echo canceller 90 are semi-static. That is, they do not change on a regular basis. In the alternative embodiment, the coefficients of the first echo canceller adapt, but more slowly. In both of these embodiments, the semi-static or slow adapting coefficients may be referred to more generally as the low adaptation coefficients.

The application of the coefficient bank 54 in the first echo canceller 90 results in an echo prediction signal. This is then combined with the echo-bearing signal at 56, typically some kind of arithmetic unit, where the combination may involve addition, subtraction or other operations on the two signals. This combining operation results in a semi-static echo canceled signal.

The coefficient bank 50 of the second echo canceller 92 is adapted continuously and represents the approximate difference between the semi-static coefficients and the actual solution. The second echo-canceller is a continuously adapting difference solution canceller. The coefficient bank 54 of the first echo canceller 90 only changes when a control algorithm operating on the second echo canceller 92 has determined that the second echo canceller has reconverged sufficiently to a new solution. Then, at least a portion of the difference coefficients of the second echo canceller is added to the first echo canceller.

The second echo canceller has a topology that is similar to McLaughlin (U.S. Pat. No. 6,263,078). The second echo canceller 90 applies coefficients $G_1$ in bank 50 to produce a difference echo prediction signal. This is combined with the semi-static echo-canceled signal at 60 to produce a semi-static difference echo canceled signal. In addition, the echo prediction signal is tapped and routed through a multiplication by an adapted gain $g_2$, 58. This adapted or adaptive gain $g_2$ is part of the third echo canceller 94.

The third echo canceller 94 takes as one input the echo prediction of the second echo canceller 92. It then uses this input as the reference signal. The third echo canceller 94 also continuously adapts its single coefficient, $g_2$. In this manner, the first echo-canceller provides a semi-static solution. The second echo-canceller provides a semi-static plus difference solution. The third echo-canceller provides a semi-static plus difference projection solution.

When a sudden change along the echo path occurs, the first echo canceller coefficients will not model the echo accurately. The second echo canceller is allowed to adapt and the resulting second echo canceller coefficients are difference coefficients. That is, they provide an estimate of the difference solution between the first echo canceller coefficients and the desired total response.

While the second echo canceller is adapting, it is very likely that the initial increments in the coefficients 50 accurately project the final result. Therefore, the adaptive gain stage 58 is adapted to increase the difference prediction. This gain stage may be implemented as a one-coefficient least mean square adaptive filter. This way, the second echo canceller can essentially "guess" the new solution. The difference projection is combined with the semi-static echo prediction at 62, resulting in a semi-static plus difference projection signal.

When the adaptive gain g settles back to near unity and stabilizes, the variation between the difference echo prediction signal at 50 and the difference echo prediction signal at 58 will be substantially the same. At this point, it can be determined that the system has reconverged to the new solution. Due to the system convergence on a new solution, a fraction of the difference coefficients can be added to the first echo canceller coefficients. When the convergence occurs and after the semi-static coefficients are updated with the new information, the difference coefficients are generally reduced by an equal amount that was added to the first echo canceller coefficients.

The remainder of the difference coefficients continues to be used to adapt the adaptive gain $g_2$. When the convergence happens, the adaptive gain $g_2$ should be reduced by an amount so that the result is the same. As an example of this reduction, if a factor P of each difference coefficient is added to the first coefficient set, the same amount should be subtracted from each difference coefficient. However, for the result to be equivalent, the adaptive gain would have to be set to:

$$g_{new}=(g_{old}-P)/(1-P)$$

For example, if $P=0.75$, then $g_{new}=(g_{old}-0.75)/0.25$. While the second echo canceller is adapting, the gain is also adapting. As mentioned above, the gain is adapted with a normalized least mean square adaptation technique. Implementation of $g_2$ as a single coefficient makes for a high degree of simplicity. The adaptive filter technique is similar to what is commonly known as a normalized least mean square adaptive filter. One advantage of this technique is that it exhibits very well understood stability.

In general, the signal processing in the diagrams is performed on groups of samples at a single time. These are called blocks, and the block size is labeled Nb.

The equation for adapting g is:

$$g=(g_{old})+\text{Sum}(error2_i*y_i)*(StepSize)/(\text{Max}((\text{Sum}(y_i*y_i)),(MinPower*N_b)))$$

where the Sum(..) function is the summation of the elements for that block of samples $N_b$ ($i=0$ to $Nb-1$);

Max(..) is a function that returns the maximum of its arguments;

$error2_i$ is the value of each element in the block of samples of the semi-static plus difference projection solution;

$y_i$ is the value of each element in the block of samples that come from the difference echo prediction.

This is a time domain normalized least mean square (NLMS) technique as applied to a single coefficient model. Like other NLMS practical applications, there is a MinPower parameter that limits the speed of adaptation for power levels that are not meaningful.

In one embodiment, this adaptation equation is only adapting a single coefficient, the adaptation feedback loop is very stable. Therefore, it is possible to use a much higher StepSize for this equation that would be used for adapting the coefficients of the high adaptive filter $G_1$ model. Also, since there is always the ability to fall back to the standard adaptive filter result, there is little risk in letting the single-coefficient adaptive filter adapt at a very fast pace and adapt on very small signals or even noise.

The particular equation for adapting the $g_2$ coefficient is to use the above-mentioned normalized LMS technique. However, in fact, there can be more than one $g_2$. It is suggested, for example, that there may be a plurality of compensators, each with a different speed of adaptation. The parameter StepSize determines the speed of convergence. If the step-size is bigger, the error adapts much faster when there is an echo path change, for example. A big step-size, however, has more error in the static case when the echo path has been stable for a long time. A larger step-size causes more erratic computation of $g_2$ because it is more sensitive to noisy or interfered signals.

In general, the processing will be done on groups of samples called blocks as mentioned above. Each echo-cancelled signal will be available as a block of samples. In FIG. 6 there are three echo-cancelled blocks of samples that are available for selection for transmission: (a) semi-static plus difference, (b) semi-static plus difference projection, and (c) semi-static. In the embodiment of FIG. 7, the corresponding signals are also available, namely: (a) slow adapted plus difference, (b) slow adapted plus difference projection, or (c) slow adapted.

In FIG. 7, the first echo canceller 96 does not receive any changes to the coefficients from the second echo canceller, but is instead allowed to adapt, albeit much more slowly than the second echo canceller 98. The low adaptation signal in this example is the slow adapted signal.

In the second embodiment of this invention, the first echo canceller 96 is allowed to adapt independently of the second adaptive filter. Unlike Duttweiler, the embodiments of the invention teaches that the first echo canceller 96 would have a large set of coefficients 76 to model a longer echo time and the second echo canceller 98 can or should have a substantially smaller set of coefficients 60. This embodiment is illustrated in FIG. 7. Embodiments of this invention presume that the first filter may consist of a very long set of coefficients, while the second set of coefficients is a shorter set corresponding more closely to the direct echo coupling and not the longer-term indirect coupling.

The advantage of this arrangement is that it can require less memory than the previous embodiment. In this alternative arrangement the presumption is that the first adaptive filter is allowed to adapt slowly. Therefore, this filter will have a very accurate representation of the echo model as long as the echo model is static. When the echo model suddenly changes the first adaptive filter will change gradually, but in the second echo model the difference model will change much more quickly. Like the previous embodiment, the echo prediction of the second echo model will be used as the difference model and this signal will be used to project the new solution.

As the slow adaptive, or low adaptive, filter 96 converges to the new solution then the coefficients of the difference model will get smaller and smaller. The gain $g_2$ might become less than unity in this case as convergence to the new solution.

In this manner, the first echo canceller 96 is a slow continuously adaptive echo canceller providing a slowly adapting solution. The second echo canceller 98 is a fast continuously adapting difference canceller providing a slow adapting plus fast adapting difference solution. The third echo canceller 100 uses the echo prediction of the second echo canceller to use as the reference signal. The third echo canceller provides a slow adapting plus projection of fast adapting difference solution for the echo prediction.

With the three signals available in either embodiment, it becomes necessary to select the appropriate output signal for transmission to the far-end caller. The same selection means could be used for either embodiment. Generally, the block with the least energy is selected as the winning block.

To select the best solution at the signal selectors 64 or 72 in FIGS. 6 and 7, the energy in each block is computed for each of the possible echo-cancelled signals. The energy is computed by summing the squared magnitudes of each element in the vector.

$$\text{Energy}=\text{Sum}(x_0^2, x_1^2, \ldots x_{N-1}^2)$$

Where Sum is the sum of adding all the elements, x[i] represents the value of each element in the block, and there are N samples in the block.

In general, the echo-cancelled block with the least power is declared the winning solution, and that block of data is selected for transmission to the far-end caller. The Signal Selector is composed of the energy computation and means to select the block with the lowest energy.

The $g_2$ value is used to help the controller decide to adapt the filter. Therefore, it is expected that the $g_2$ estimate will float back to 1.0 and as the adaptive filter gradually adapts to the new echo model solution.

It is suggested that $g_2$ can be used to modify estimates of performance. For example, a measure of the echo return loss enhancement (ERLE) should be reduced in accordance with the difference between $g_2$ and unity.

If the winning selection is the semi-static plus difference solution and not the difference projection then this situation is identically equivalent to the gain estimate $g_2$ being identically unity. In this case, the actual gain estimate $g_2$ is very likely to be invalid altogether. Therefore, the estimate of $g_2$ is accelerated toward unity. In practice, it was found that $g_2$ should not be reset to unity right away, because it might have a degree of validity. The simplest means to accelerate the estimate to unity is to simply recompute the adaptation equation again, but with a larger step size.

Figure 8:
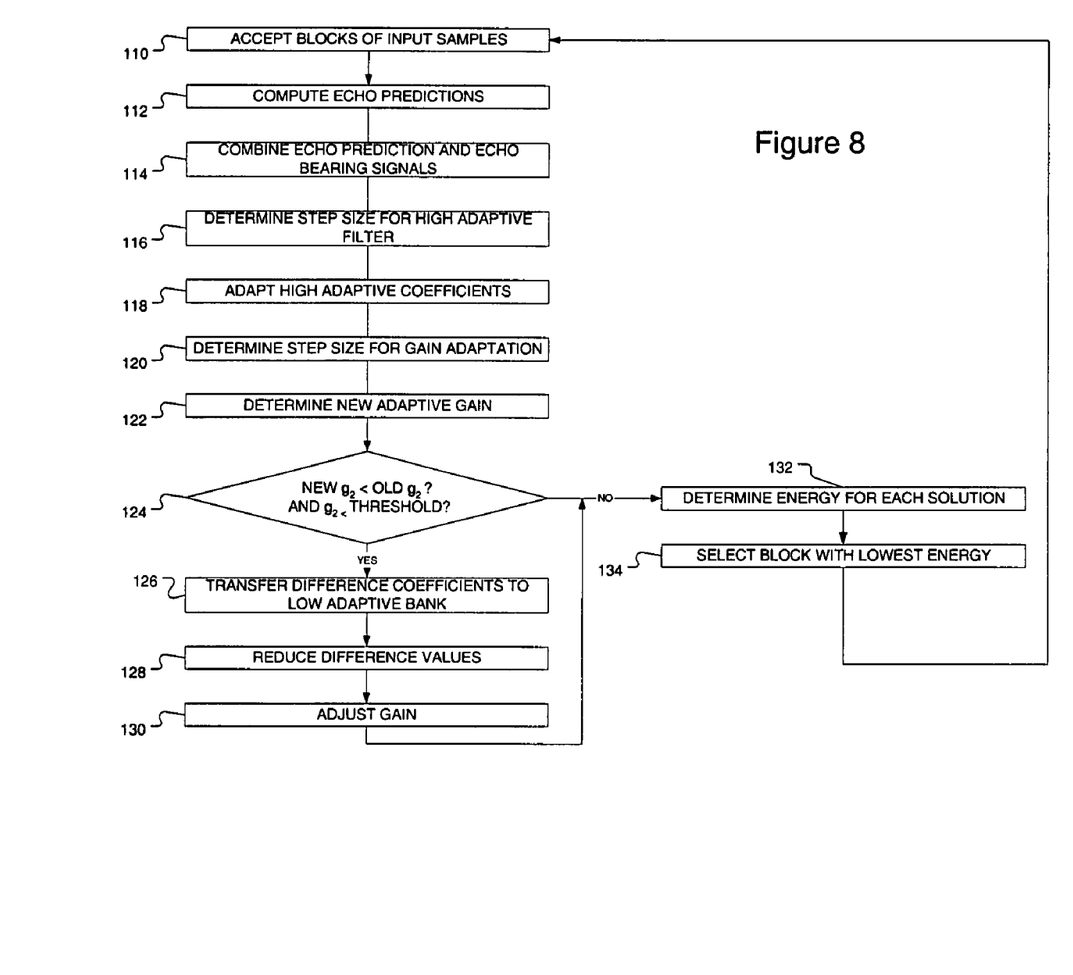
FIG. 8 is a flowchart of an embodiment of a method of performing echo canceling.

A general process for performing two-bank echo cancellation is shown in FIG. 8. The process begins at 110 with a new block of samples being accepted for input. At 112, the echo predictions are computed for the block of samples, and then combined with the echo bearing signals at 114. The step size for the high adaptive filter, in the embodiment of FIG. 6 this would be the second echo canceller 92, and the coefficients in bank 50 are adapted at 116. The step size for the gain stage 58 is determined at 120, and the new $g_2$ is determined at 122.

The decision 124 to update the semi-static coefficients is dependent on reconvergence of the gain $g_2$ towards unity. The gain $g_2$ should be both decreasing and less than a predetermined threshold, which is usually slightly greater than unity. If this test is met then a fraction of the difference coefficients are added to the semi-static coefficients at 126. The difference coefficients are reduced at 128 by the same amount as the amount that was added to the semi-static coefficient bank. The gain $g_2$ is recomputed at 130 to compensate for the reduction of the values in the difference coefficient bank.

The energy for each possible echo-cancelled block is computed at 132. If the decision at 124 had been NO, this process is performed immediately. The block with the lowest energy, also having the least amount of echo, is selected at 134 for transmission to the far-end. The process then repeats for a new block of samples at 110, unless there is no longer any echo bearing signals, such as if the conversation on the device has ended.

Figure 9:
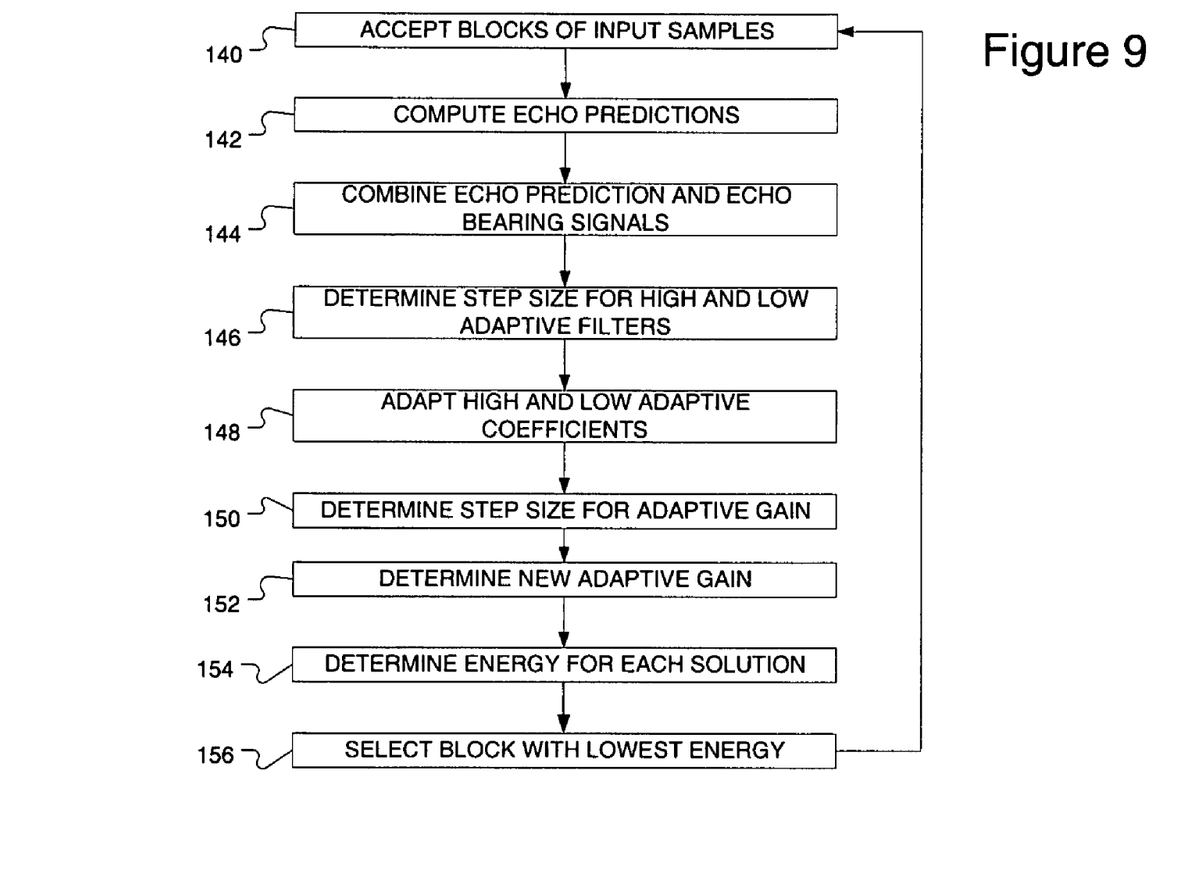
FIG. 9 is a flowchart of an embodiment of a method of performing echo canceling.

A general process for performing the alternative embodiment of the invention is shown in FIG. 9. The differences between these approaches are that for the alternative embodiment, all three echo canceller structures are continuously adapted, and not just two. There is no transfer of difference coefficients, and hence there is no decision necessary about such a transfer.

The blocks of input samples are accepted at 140, and the echo predictions computed at 142. The echo prediction and echo bearing signals are combined at 144. The step size for both the high adaptive and low adaptive filters are determined at 146. The high and low adaptive coefficients are adapted at 148. Note that in this embodiment, the high adaptive coefficients are the fast adapting difference coefficients and the low adaptive coefficients are the slowly adaptive coefficients. The step size for the adaptive gain is determined at 152.

As there is no transfer of difference coefficients in this embodiment, so there is no decision necessary about whether to transfer the coefficients. Once adaptive gain is determined, all three solutions are present. The energy for each solution is determined at 154 and the one resulting in a block of samples having the lowest energy is selected at 156.

It should be appreciated by practitioners in the art that the coefficients of the echo model might be expressed either in the time domain, or in the frequency domain, or as a hybrid such as a block frequency domain adaptive filter, or they could be subband adaptive filters. The invention does not presume the particular computational model for the adaptive filter, nor does it presume the means to adapt the large adaptive filter models.

Thus, although there has been described to this point a particular embodiment for a method and apparatus for a two-bank echo canceller, it is not intended that such specific references be considered as limitations upon the scope of this invention except in-so-far as set forth in the following claims.

What is claimed is:

1. A device, comprising:
   a first echo canceller to receive a reference signal and an echo-bearing signal, the first echo canceller comprising;
   a first bank of coefficients to be applied to the reference signal to produce a first echo prediction signal;
   a first arithmetic unit to combine the first echo prediction signal with the echo-bearing signal to produce a first echo-cancelled signal;
   a second echo canceller to receive the reference signal and the first echo-canceled signal, the second echo canceller comprising:
   a second bank of coefficients to be applied to the reference signal to produce a second echo prediction signal, wherein the second bank of coefficients are adapted to improve echo cancellation in the second echo canceller;
   a second arithmetic unit to combine the first echo-cancelled signal with the second echo-prediction signal to produce a second echo-cancelled signal;
   a third echo canceller to receive as an input the second echo prediction signal and the first echo cancelled signal, the third echo canceller comprising:
   an adaptive gain to be applied to the second echo prediction signal to produce a third echo prediction signal; and
   a third arithmetic unit to combine the third echo prediction signal with the first echo-cancelled signal to produce a third echo-cancelled signal; and
   a selector to select one of the first, second or third echo-cancelled signals.

2. The device of claim 1, the first bank of coefficients also to be adapted to improve the echo cancellation of the first echo canceller.

3. The device of claim 1, the second bank of coefficients also to be used to update the first bank of coefficients.

4. The device of claim 1, the adaptive gain further comprising a bank of a single coefficient to be applied to the second echo prediction signal.

5. The device of claim 1, the selector further comprising a selector to:
   compute an energy measure of block of samples for each echo-cancelled signal; and
   select the blocks having a lowest value of the energy measure.

6. A device, comprising:
   an input line to receive a first signal;
   an audio output component to allow the first signal to be made audible;
   an audio input component;
   a slow adaptation echo canceller to generate a first echo-cancelled signal using low adaptation coefficients;
   a high adaptation echo canceller to generate a second echo-cancelled signal using continuously adapting coefficients; and a selector to select one echo-cancelled signal for output.

7. The device of claim 6, the low adaptation echo canceller further comprising a semi-static set of coefficients and the first echo-canceled signal further comprising a semi-static echo prediction signal.

8. The device of claim 7, the second echo-cancelled signal further comprising a semi-static difference echo prediction signal.

9. The device of claim 7, the device further comprising an adaptive gain module to produce a third echo-canceled signal, wherein the third echo-canceled signal further comprises a semi-static difference echo projection signal.

10. The device of claim 9, the adaptive gain module further comprising a module having a single coefficient.

11. The device of claim 6, the low adaptation echo canceller further comprising a slow adapting echo canceller and the first echo-canceled signal further comprising a slow adapted echo prediction signal.

12. The device of claim 11, the second echo-canceled signal further comprising a slow adapted difference echo prediction signal.

13. The device of claim 11, the device further comprising an adaptive gain module to produce a third echo-canceled signal, wherein the third echo-canceled signal further comprises a slow adapted difference echo projection signal.

14. The device of claim 13, the adaptive gain module further comprising a module having a single coefficient.

15. The device of claim 6, the low adaptation echo canceller being connected to the high adaptation echo canceller such that coefficients in the low adaptation echo canceller are adjusted depending upon coefficients in the high adaptation echo canceller.

16. A method of filtering an input signal, comprising:
    determining that a change in an echo path has occurred for a received signal;
    applying a slow adaptation filter with low adaptation coefficients to the received signal to produce at least one echo canceled signal;
    applying a high adaptation filter with continuously adapting coefficients to the received signal to produce at least one echo canceled signal; and
    selecting an optimal echo canceled signal for output.

17. The method of claim 16, applying a low adaptation filter to the received signal further comprising multiplying samples of the received signal by a first set of coefficients to produce a slow adapted echo prediction signal.

18. The method of claim 17, applying a high adaptation filter to the received signal further comprising multiplying samples of the received signal by a second set of coefficients to produce a slow adapted difference echo prediction signal.

19. The method of claim 18, the method further comprising:
    combining the slow adapted echo prediction signal with an echo bearing signal to produce a slow adapted echo canceled signal; and
    combining the slow adapted echo canceled signal with the slow adapted difference echo prediction signal to produce a slow adapted difference echo-canceled signal.

20. The method of claim 19, the method further comprising:
    applying an adaptive gain to the slow adapted echo prediction signal to produce a slow adapted echo projection signal; and
    combining the slow adapted echo projection signal with slow adapted echo canceled signal to produce a slow adapted difference projection echo-canceled signal.

21. The method of claim 16, applying a low adaptation filter to the received signal further comprising multiplying samples of the received signal by a first set of coefficients to produce a semi-static echo prediction signal.

22. The method of claim 21, applying a high adaptation filter to the received signal further comprising multiplying samples of the received signal by a second set of coefficients to produce a semi-static difference echo prediction signal.

23. The method of claim 22, the method further comprising:
    combining the semi-static echo prediction signal with an echo bearing signal to produce a semi-static echo canceled signal; and
    combining the semi-static echo canceled signal with the semi-static difference echo prediction signal to produce a semi-static difference echo-canceled signal.

24. The method of claim 23, the method further comprising:
    applying an adaptive gain to the semi-static echo prediction signal to produce a semi-static echo projection signal; and
    combining the semi-static echo projection signal with semi-static echo canceled signal to produce a semi-static difference projection echo-canceled signal.

25. A device, comprising:
    a means for receiving a first signal;
    a means for allowing the first signal to be made audible;
    a means for inputting an audio signal;
    a means for generating a first echo-cancelled signal;
    a means for generating a second echo-cancelled signal;
    a means for generating a third echo-cancelled signal; and
    a means for selecting one echo-cancelled signal from the first, second or third echo-cancelled signals for output.

26. The device of claim 25, the means for producing a third echo-canceled signal further comprising a single coefficient.

27. An article of machine-readable media containing instruction that, when executed, cause the machine to:
    determine that a change in an echo path has occurred for a received signal;
    apply a slow adaptation filter to the received signal to produce at least one echo canceled signal;
    apply a high adaptation filter using continuously adapting coefficients to the received signal to produce at least one echo canceled signal; and
    select an optimal echo canceled signal for output.

* * * * *